April 19, 1932. C. D. COLLINS 1,854,449
GUN TYPE DUSTING APPARATUS
Filed Oct. 7, 1930 2 Sheets-Sheet 1
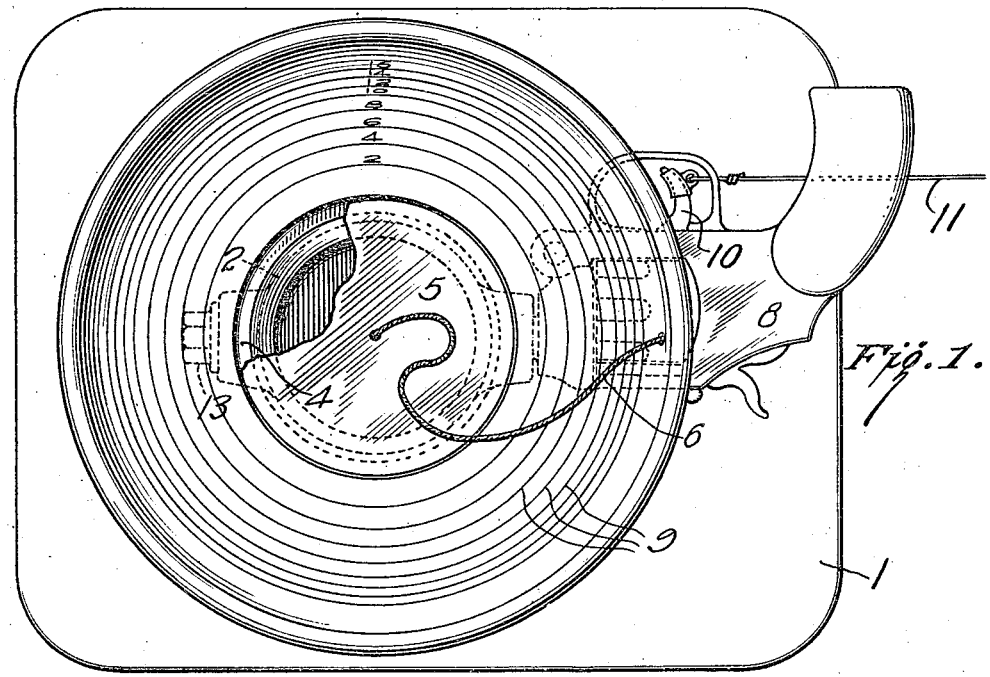
Fig. 1.
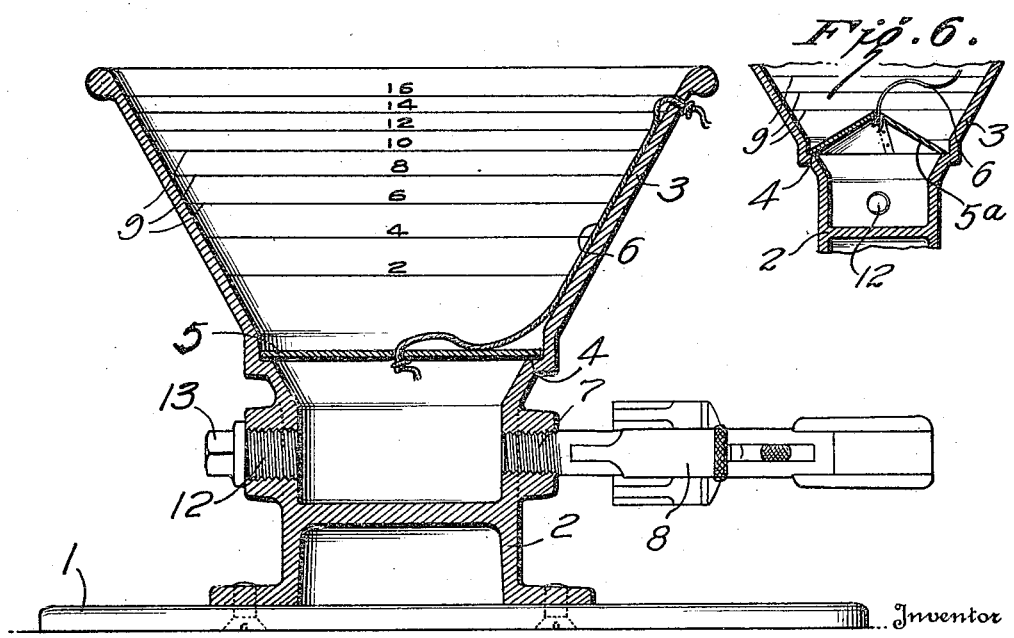
Fig. 6.
Fig. 2.
Inventor
CHARLES D. COLLINS,
By
Attorney April 19, 1932.    C. D. COLLINS    1,854,449
GUN TYPE DUSTING APPARATUS
Filed Oct. 7, 1930    2 Sheets-Sheet 2
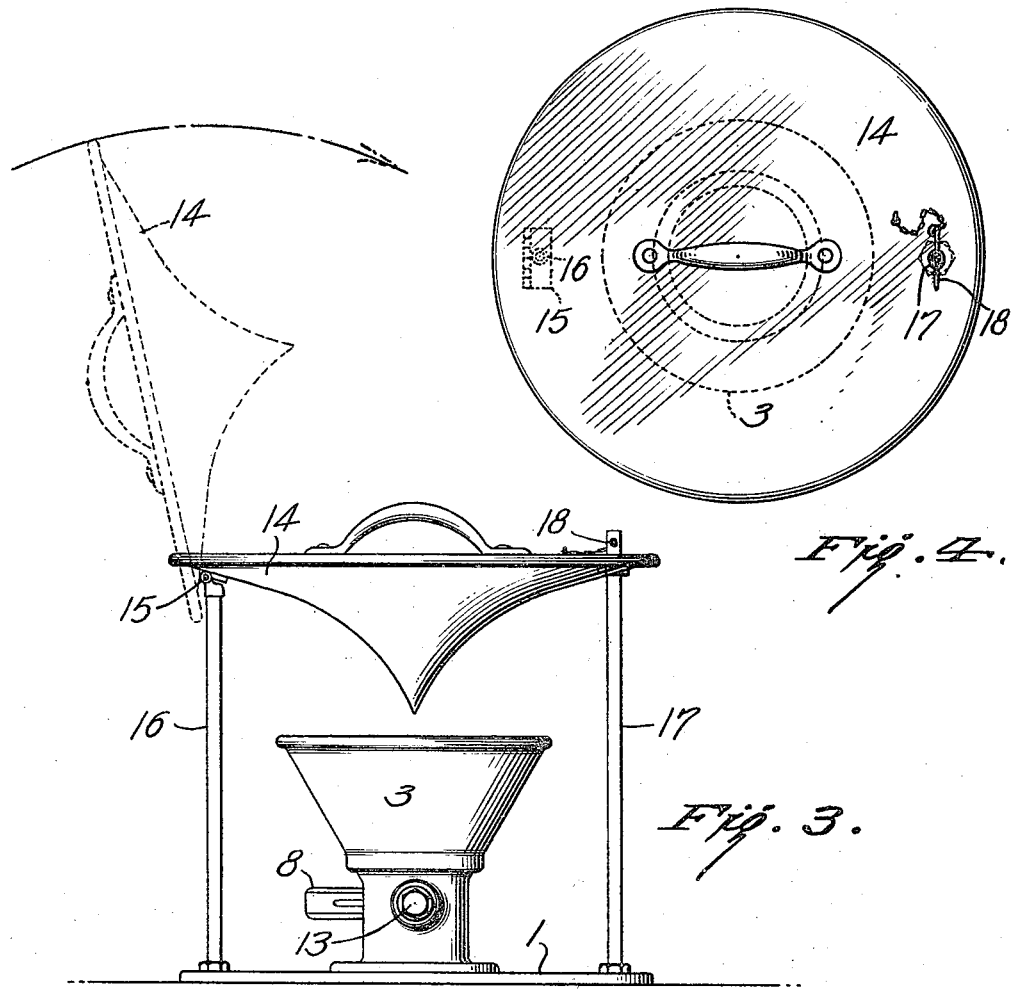
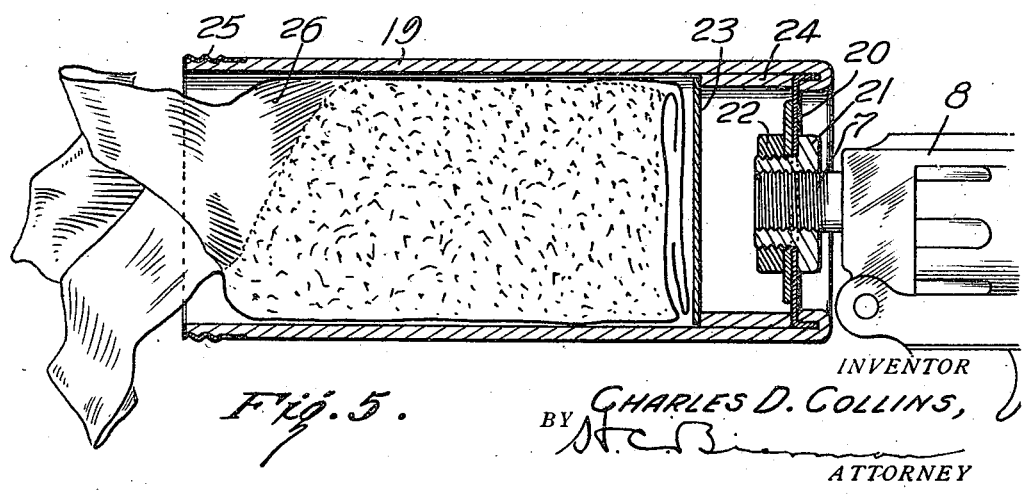
INVENTOR
CHARLES D. COLLINS,
BY
ATTORNEY Patented Apr. 19, 1932

1,854,449

UNITED STATES PATENT OFFICE

CHARLES D. COLLINS, OF NEW YORK, N. Y., ASSIGNOR TO AMERICAN CYANAMID COMPANY, OF NEW YORK, N. Y., A CORPORATION OF MAINE

GUN TYPE DUSTING APPARATUS

Application filed October 7, 1930. Serial No. 486,907.

The present invention relates to a device for distributing powdered or granular materials in the form of dust.

The principal object of the invention is the provision of means for the distribution or scattering of dust-like particles over a comparatively wide area, quickly, effectively and cheaply.

In the fumigation art, it is particularly desirable to thoroughly distribute the fumigating material throughout the area to be fumigated and quickness of distribution is necessary where a fumigant such as crude calcium cyanide is used. This material reacts rapidly with atmospheric moisture, with the production of hydrocyanic acid gas, and hence it is necessary that distribution take place as quickly as possible and that the operator be out of or leave the fumigated zone in order to avoid breathing the very poisonous gas.

While the invention is particularly applicable to the distribution of crude calcium cyanide dust, yet obviously it may be advantageously used to cause the rapid scattering or dusting of any desired material.

One aspect of the invention contemplates the use of a chamber within which the dust or material to be distributed will be received, said chamber having also secured thereto means for explosively discharging gases into the chamber in order to forcibly expel the dusting material therein. Such means may conveniently consist of a cartridge shooting gun or the like.

The invention further contemplates the combination with a device of the above character, of a distributing means such as a conical canopy or the like, arranged and located in the path of the expelled dust so as to further and more completely disseminate and scatter the same.

In another aspect of the invention, it is contemplated that the dust receiving chamber may be of such form and shape as to accommodate a package of the dusting material, in any desired quantity, the chamber being provided with a cover means so that the entire device may be readily handled, the dusting material being held substantially airtight within the chamber so that no loss or decomposition thereof will take place prior to expulsion.

The invention further consists in the novel arrangement, combination and construction of parts more fully hereinafter shown in the accompanying drawings.

In the drawings:

Fig. 1 is a plan view of one embodiment of my invention.

Fig. 2 is a side view partly in section of the device of Fig. 1.

Fig. 3 is a side view of a modified form of the invention.

Fig. 4 is a plan view of the device of Fig. 3.

Fig. 5 is a side view partly in section of still another form of the invention.

Fig. 6 is a fragmentary side elevation of a modified form of the device.

Referring now with particularity to the embodiment shown in Figs. 1 and 2, there is indicated a base 1 upon which is secured a casting or the like 2, the upper portion of which forms a hopper or dust receiving chamber 3. At a suitable point in the hopper walls a seat 4 is provided upon which is adapted to rest a removable wad 5 which may take the form of a thin metal or fiber plate or the like. If desirable, the wad 5 may be loosely secured to the hopper 3 as by means of flexible cord 6.

Into the wall of the casting 2 and below the hopper 3 is secured as by means of screw threads, the end of the barrel of a gun or revolver 8, adapted to discharge a blank cartridge. As shown in Figs. 1 and 2, the direction of fire of the gun 8 is substantially at right angles to the axis of the hopper 3.

In operation, the removable wad 5 being put in place, a desired dosage of dusting material may then be filled into the hopper, graduations 9 indicating the capacity of the hopper at any point. A cartridge is loaded into the gun and the trigger 10 manipulated to fire the cartridge, which causes the discharge from the gun of gases with explosive force, which act against the removable wad 5 to quickly expel and efficiently scatter the contents of the hopper. The trigger 10 may be remotely manipulated by the operator through the flexible cord 11 attached to the trigger.

Where comparatively large quantities of the dust are to be expelled from the hopper, or where using a dusting material comparatively heavy, it may be desirable to use a cartridge which will generate more gases than would be the case were a smaller quantity or lighter material used. For this purpose the casting 2 is provided with another threaded aperture 12 of a size adapted to receive a gun of larger caliber than the gun 8. When not in use, the aperture 12 may be closed by the threaded plug 13.

Due to the fact that the removable wad 5 is tied to the hopper 3, this is not lost upon expulsion of dust from the hopper and may be readily replaced for a second shot.

It will be apparent that this form of the device is readily portable and may be placed in a room or other location where fumigation or dusting is desired to be resorted to and upon discharge of the gun, the material will be quickly and thoroughly disseminated in an upward direction.

In order to more thoroughly distribute and disseminate the dusting material horizontally, the combination shown in Figs. 3 and 4 may be used. This consists of the device of Figs. 1 and 2 and in addition a conical canopy 14 hinged as at 15 and supported upon standards 16 and 17 normally in the path of dust to be expelled from the hopper. For the purpose of filling the hopper, the conical canopy 14 may be swung upwardly into the position shown in the dotted lines of Fig. 3. When in use, the canopy may be lowered as shown in the full lines of Fig. 3, and a pin 18 inserted in the aperture at the end of standard 17 to prevent displacement of the canopy upon expulsion of the dust within the hopper.

This instrumentality may be found effective, for instance, in the distribution of a fumigant into an area including a citrus tree or the like, where it is not desired to have the dust, such for instance as crude calcium cyanide, actually come in contact with the tree itself. Upon firing the gun in the combination shown in Fig. 3, the dust will be quickly and efficiently disseminated in a horizontal direction beneath the tree, the atmospheric moisture acting upon the cyanide and enveloping the tree in hydrocyanic gas to the desired concentration, determined by the dosage.

In Fig. 6 a modified form of removable wad is shown at 5a to consist of a conical element, the sides of which are substantially at right angles to the hopper walls. Such a construction has been found to more clearly and completely remove all the dusting material from the hopper upon firing of the gun.

Where a more mobile form of the device is required, that is, where it may be found necessary to shoot the dust horizontally or in any other direction, the modification shown in Fig. 5 will be found to be particularly desirable. Here the dust receiving chamber is shown to consist of a substantially cylindrical container 19, into one end 20 of which the gun 8 is secured as by threading the end of the barrel 7 into a sleeve 21 which is in turn secured to the end 20 as by an annular nut 22. A removable wad 23 is provided which normally seats upon a built-up portion 24 of the wall of the chamber. The opposite end of the dust receiving chamber 19 is provided with a threaded member 25 adapted to receive a cap or the like, not shown, which may be of any ordinary construction such as that used on a cardboard mailing tube. In this form of the invention, the material to be dusted may be placed within a frangible container 26 such as a thin paper package or bag, and upon placing the cap on the end of the chamber 19, the dusting material is securely held within the chamber against accidental displacement and substantially against decomposition, until ready for use. As such, the entire combination may be safely and conveniently handled. To discharge the dust, it becomes only necessary to unscrew the cover or cap from the chamber 19, point the outfit in the desired direction and manipulate the trigger of the gun 8, whereupon the cartridge delivers gases against the removable wad 23 with explosive force which will be sufficient not only to disrupt the frangible container 26 but to scatter and disseminate the dusting material in the direction desired.

In all forms of the invention it will be apparent that other forms of hoppers or dust containing chambers may be utilized or other methods of explosively discharging gases against a volume of dust contained within the chamber, without departing from the spirit of the invention.

It will also be apparent that while the invention has been shown and described with particular reference to a certain set of instrumentalities, yet it is not to be limited thereto but is to be construed broadly and restricted only by the scope of the claims.

I claim:

1. A dusting apparatus comprising a dust receiving chamber and means within which gases may be explosively generated and delivered therefrom to the dust chamber, and a removable wad between the dust chamber and the gas generating means and having limited movement.

2. A dusting apparatus comprising a dust receiving chamber and a cartridge shooting gun secured in proximity thereto, whereby gases from the exploding cartridge may be directed to expel dust in the chamber, and a removable wad between the gun and the chamber to receive the impact of the gases from the exploding cartridge and having limited movement.

3. A dusting apparatus comprising in combination a dust receiving hopper having a removable bottom, and a cartridge shooting gun secured to the hopper below the bottom.

4. A dusting apparatus comprising in combination a dust receiving hopper having a removable bottom, a plurality of gun receiving apertures in the hopper below the bottom to receive guns of different calibers, a cartridge shooting gun secured in one aperture and a plug in another aperture.

5. A dusting apparatus comprising in combination a dust receiving hopper having a removable bottom, and a cartridge shooting gun secured to the hopper below the bottom, the direction of fire of said gun being at right angles to the axis of the hopper.

6. A dusting apparatus comprising in combination a dust receiving hopper of substantially inverted frusto-conical configuration, a removable conical wad in the hopper, and a cartridge shooting gun secured below the wad.

7. A dusting apparatus comprising in combination a dust receiving hopper of substantially inverted frusto-conical configuration, a removable conical wad in the hopper, the sides of the cone being substantially at right angles to the sides of the hopper, and a cartridge shooting gun below the wad.

8. A dusting apparatus comprising in combination a dust receiving hopper having a removable wad and a cartridge shooting gun secured to the hopper below the wad, and means for scattering dust expelled from the hopper.

9. A dusting apparatus comprising in combination a dust receiving hopper having a removable wad, and a cartridge shooting gun secured to the hopper below the wad, and a dust distributor secured in the path of dust expelled from the hopper.

10. A dusting apparatus comprising in combination a dust receiving hopper having a removable wad, and a cartridge shooting gun secured to the hopper below the wad, and a dust distributor secured in the path of dust expelled from the hopper, said distributor being hinged and adapted to be swung into and out of the path of said expelled dust.

11. In combination, a dust receiving chamber, a cartridge shooting gun secured in one end of said chamber, a cover for the other end of said chamber, and a removable dividing wall between the chamber ends.

12. A dusting apparatus comprising a dust receiving chamber having dosage graduations on the interior thereof and means for explosively introducing gases under pressure to said chamber whereby dust in the chamber may be expelled therefrom.

13. A fumigant package comprising an outer container, end walls therefor, a removable wad between the end walls, a frangible fumigant package within the container between one end wall and the intermediate wall and means carried by an end wall for attachment thereto of a cartridge shooting gun.

14. A fumigant package comprising an outer container, end walls therefor, a removable wad between the end walls, a frangible fumigant package within the container between one end wall and the intermediate wall and means for introducing gases under pressure through one of the end walls.

In testimony whereof, I have hereunto subscribed my name this 3rd day of October, 1930.

CHARLES D. COLLINS.